United States Patent
Shimanuki

(10) Patent No.: US 8,599,518 B2
(45) Date of Patent: Dec. 3, 2013

(54) HEAD-CLEANING DEVICE AND HEAD-CLEANING METHOD

(75) Inventor: Hiroyuki Shimanuki, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 13/434,102

(22) Filed: Mar. 29, 2012

(65) Prior Publication Data

US 2012/0250188 A1 Oct. 4, 2012

(30) Foreign Application Priority Data

Mar. 31, 2011 (JP) .................................. 2011-078780

(51) Int. Cl.
*G11B 5/40* (2006.01)
(52) U.S. Cl.
USPC .......................................................... 360/128

(58) Field of Classification Search
USPC .......................................................... 360/128
See application file for complete search history.

(56) References Cited

U.S. PATENT DOCUMENTS

| | | | |
|---|---|---|---|
| 5,867,352 A * | 2/1999 | Dohmen | 360/130.21 |
| 8,270,113 B2 * | 9/2012 | Ojima | 360/128 |
| 2002/0048118 A1 * | 4/2002 | Tanaka et al. | 360/128 |
| 2007/0177303 A1 * | 8/2007 | Stamm et al. | 360/128 |
| 2012/0081814 A1 * | 4/2012 | Ojima | 360/130.31 |

FOREIGN PATENT DOCUMENTS

JP 2005-122898 A 5/2005

* cited by examiner

*Primary Examiner* — Allen T Cao
(74) *Attorney, Agent, or Firm* — Sughrue Mion, PLLC

(57) ABSTRACT

A head-cleaning device cleans the surface of a head for reading and writing data from/to a medium, and includes a cleaning unit that moves in parallel with grooves provided in the surface of the head while abutted to the grooves, and thereby cleans the surface of the head.

9 Claims, 8 Drawing Sheets

HEAD-CLEANING DEVICE AND HEAD-CLEANING METHOD

CROSS REFERENCE TO RELATED APPLICATIONS

Priority is claimed on Japanese Patent Application No. 2011-078780, filed Mar. 31, 2011, the content of which is incorporated herein by reference.

BACKGROUND OF THE INVENTION

1. Field of the Invention

The present invention relates to a head-cleaning device and a head-cleaning method for cleaning a head that reads and writes data from/to a medium.

2. Description of Related Art

There is a conventional head that reads and writes data from/to a medium (e.g. a magnetic tape cartridge), and there is a conventional cleaning device for cleaning the head with a brush or the like so that dirt does not accumulate on the head, which is described, for example, in Japanese Unexamined Application, First Publication, No. 2005-122898 (Patent Document 1).

An operation of a head-cleaning device relating to the present invention represented by the Patent Document 1 will be explained using FIGS. 5A and 5B. The head-cleaning device in FIGS. 5A and 5B includes a brush filament 3 provided at the tip of a lever 1. FIG. 5A illustrates a state before cleaning operation starts. When cleaning operation starts in the state in FIG. 5A, the lever 1 is driven by a roller mechanism. That is, in FIG. 5A, a bearing 2 moves horizontally (in the right direction of FIG. 5A) and makes contact with one section 4 of the lever 1. This contact pushes the lever 1 in the downward direction of FIG. 5A. As a result of this downward push, as shown in FIG. 5B, the lever 1 and the brush filament 3 at the tip thereof move in a circular-arc trajectory (circular arc movement). As the brush filament 3 moves, it abuts to the surface of the head (not shown) and thereby cleans it. In FIGS. 5A and 5B the head is on the circular-arc trajectory of the brush filament 3, though it is not shown.

FIG. 6 is an example of the configuration of a head that is cleaned. The head in FIG. 6 has a linear groove (step) extending in a predetermined direction of the head. In the example of FIG. 6, a plurality of linear grooves are provided in the long direction of the head.

When the head of FIG. 6 is cleaned by the head-cleaning device of FIG. 5A, as shown in FIG. 7, the brush filament 3 abuts to the grooves in the head surface while moving in the circular-arc trajectory indicated by the arrow. However, when the brush filament 3 moves in a circular arc in this manner, some parts of the grooves in the head surface are likely to remain unswept. In particular, on a head where the grooves are arranged like steps, when the brush filament 3 moves such as to descend the stair-like grooves, parts of the grooves are likely to remain unswept. If this deficient sweeping continues, dirt and the like will accumulate on the head and lead to a danger of errors during reading and writing.

The present invention has been realized in view of the above problems, and aims to provide a head-cleaning device and a head-cleaning method that, by thoroughly cleaning grooves provided in the head, can prevent accumulation of dirt and the like due to deficient sweeping.

SUMMARY OF THE INVENTION

To achieve these objects, a head-cleaning device in accordance with the present invention cleans the surface of a head for reading and writing data from/to a medium, and includes cleaning unit that moves in parallel with grooves provided in the surface of the head while abutted to the grooves, thereby cleaning the surface of the head.

A head-cleaning method of the invention is performed by a head-cleaning device that cleans the surface of a head for reading and writing data from/to a medium. The head-cleaning device makes predetermined cleaning unit move in parallel with grooves provided in the surface of the head while abutted to the grooves, and thereby cleans the surface of the head.

According to the present invention, by thoroughly cleaning grooves provided in a head, accumulation of dirt and the like due to deficient sweeping can be prevented.

DETAILED DESCRIPTION OF THE INVENTION

Aspects (embodiments) for implementing the invention will be explained in detail with reference to the accompanying drawings.

Figure 6:
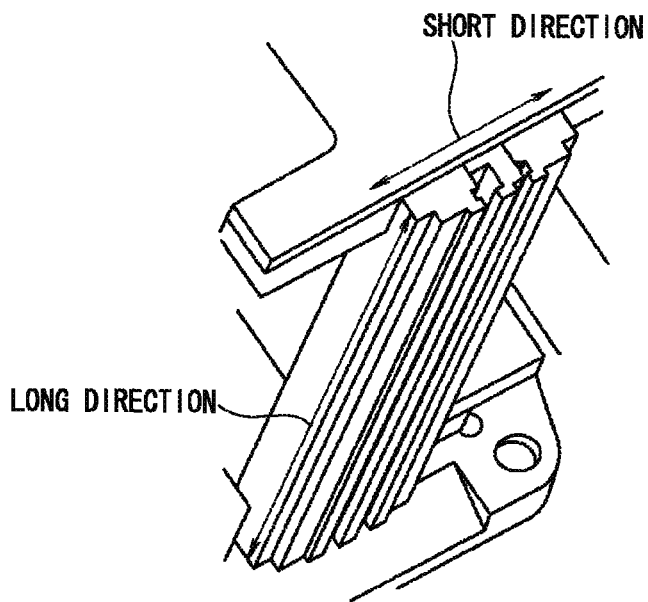
FIG. 6 is an external perspective diagram of an example of a head provided with a plurality of grooves extending in the long direction.
Figure 7:
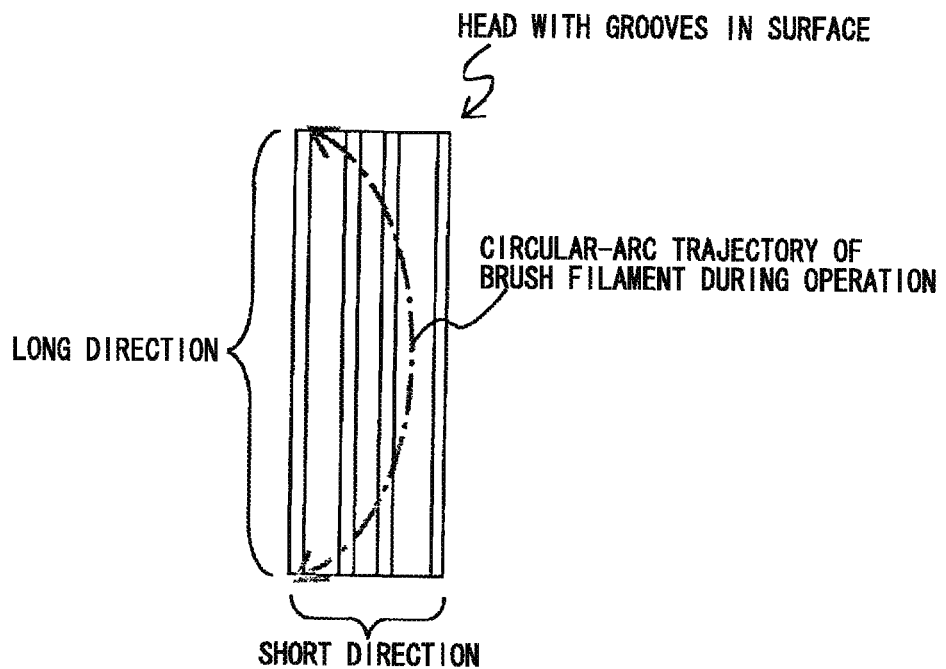
FIG. 7 is an explanatory front diagram of an example of an operation where a brush filament has moved in a circular-arc trajectory with respect to a head including grooves in a head-cleaning device according to an embodiment of the present invention.
Figure 8:
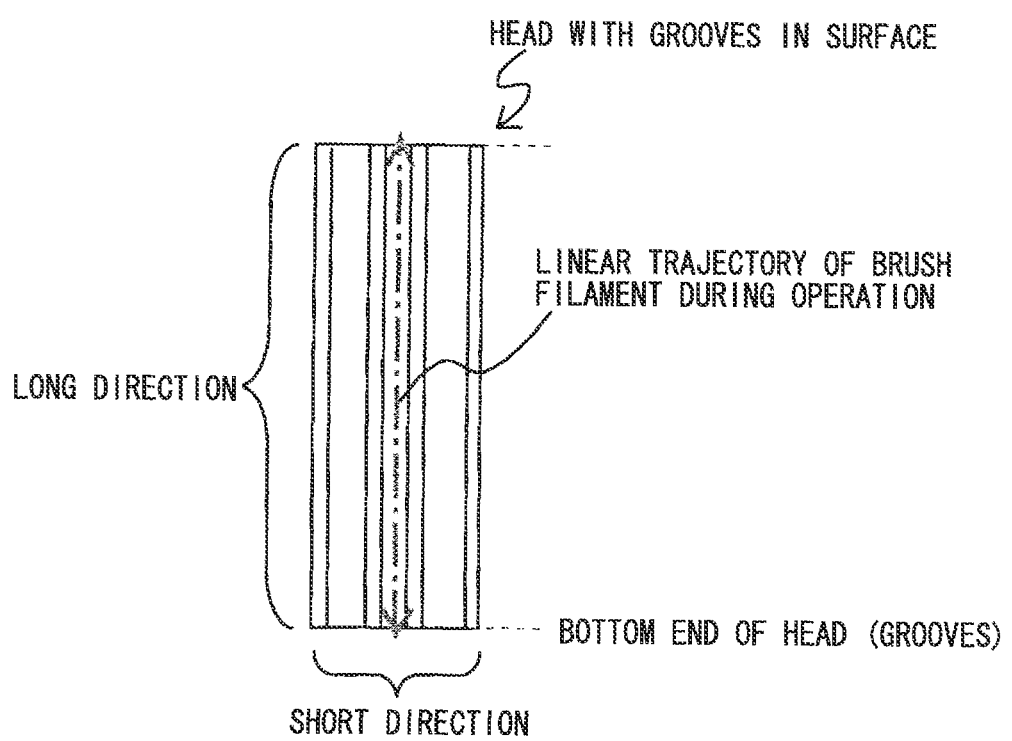
FIG. 8 is an explanatory front diagram of an example of an operation where a brush filament has moved in a linear trajectory with respect to a head including grooves in a head-cleaning device according to an embodiment of the present invention.

Firstly, a head-cleaning device of this embodiment will be described broadly. To clean a head including linear grooves provided in a predetermined direction as for example shown in FIG. 6, a head-cleaning device of this embodiment is characterized in that, instead of making a brush filament move in a circular arc as shown in FIG. 7, it makes the brush filament move linearly in parallel with the direction from the top end of the grooves to the bottom end (i.e. along the grooves) as shown in FIG. 8. Since this enables the grooves to be cleaned thoroughly, it becomes possible to remove dirt in the grooves that could not be removed adequately by a circular arc movement. As a result, it is possible to prevent dirt from accumulating in the grooves, and to prevent errors in reading and writing of data by the head due to accumulation of dirt. Specific configurations and operations for realizing such a characteristic of this embodiment will be explained below using FIGS. 1 to 4, and FIG. 9.

Figure 1A:
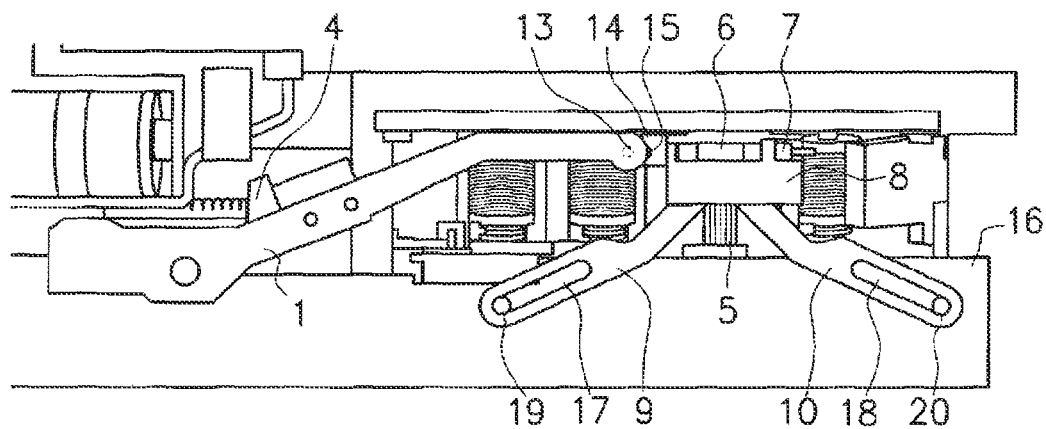
FIGS. 1A and 1B are a front diagram and a perspective diagram of an example of a state where a head-cleaning device according to an embodiment of the present invention is not performing cleaning.
Figure 1B:
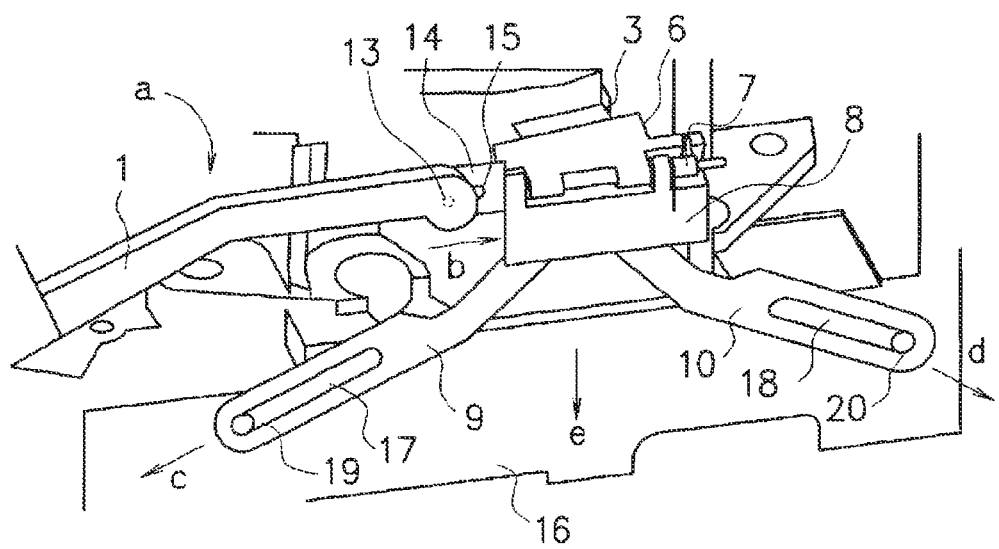

FIG. 1A is a front diagram of a head-cleaning device of this embodiment, and FIG. 1B is a perspective diagram of a head-cleaning device of this embodiment. FIGS. 1A and 1B illustrate a state before a medium such as, for example, a tape cartridge, is loaded (stored). Incidentally, the head 5 is not shown in FIG. 1B.

The head-cleaning device of this embodiment mainly includes a cleaning unit for cleaning the surface of the head, and a lever unit and two arm unit for supporting the cleaning unit and making it move. The lever 1 shown in FIGS. 1A and 1B is one example of a lever unit. Arms 9 and 10 shown in FIGS. 1A and 1B are one example of arm unit. A brush filament 3, a brush holder 6, a spring 7, and a brush holder base 8, and a connecting member 14 shown in FIGS. 1A and 1B constitute one example of a cleaning unit.

In FIGS. 1A and 1B, the brush holder 6 secures and holds the brush filament 3. The length of the brush filament 3 is such that, when it abuts to the head 5, the brush filament 3 completely abuts to the surface of all the grooves. During cleaning, the brush filament 3 abuts almost perpendicular to the head surface (the surface of the head 5 corresponds to the surface of the grooves), and it is also abutting almost perpendicular to the head surface in the state before cleaning shown in FIGS. 1A and 1B. The point that the brush filament 3 is abutting to at this time corresponds to the top end (see FIG. 8) of the head surface. The angle at which the brush filament 3 abuts to the head surface will hereinafter be termed the 'abutting angle' (see FIG. 9A below).

In FIG. 1A, while the brush holder 6 is secured to and supported by the brush holder base 8, the brush holder 6 can shake due to the spring 7. This shaking mechanism changes the angle of the brush filament 3 and the brush holder 6 with respect to the head surface. For example, they can be changed from the abutting angle to a non-abutting angle (an angle at which the brush filament 3 does not abut to the head surface), or vice versa (this angle-change will be explained in detail later using FIGS. 9A-9C). In the state of FIGS. 1A-1B and FIGS. 2A-2B, the spring 7 keeps the brush filament 3 and the brush holder 6 at an angle where the brush filament 3 abuts almost perpendicular to the head surface (the abutting angle), as shown in FIGS. 1A and 2B.

As shown in FIG. 1B, the brush filament 3 and the brush holder 6 tilt with respect to the long direction of the brush holder base 8 (corresponding to the long direction of the lever 1) so as to correspond with the predetermined tilt angle of the surface of the head 5 with respect to the abutting face of the brush filament 3. That is, when the head surface is tilting at a predetermined angle toward the abutting face of the brush filament rather than parallel with it, as shown in FIG. 1B, the brush filament 3 and the brush holder 6 are also tilted (or, only the brush filament 3 may be tilted). In this way, the angle of the tilting portion can be absorbed. This enables the brush filament 3 to abut adequately to the head surface.

In FIGS. 1A and 1B, the connecting member 14 is provided at the top-left of the brush holder 6, and is secured to the brush holder 6. The connecting member 14 is for enabling connection to the lever 1, which is rotatably provided on the deck base 16. A pivot 13 (one example of a protrusion) is secured at the tip of the lever 1 to a face thereof that is opposite the connecting member 14. A long guide hole 15 (one example of a long-hole part) is provided in the connecting member 14 in a face opposite the tip of the lever 1. The pivot 13 fits into the long guide hole 15, whereby the lever 1 and the connecting member 14 are connected to the brush holder base 8. The long guide hole 15 is almost parallel with the long direction of the brush holder base 8 in FIG. 1A. In conjunction with the movement (circular-arc movement) of the lever 1, the pivot 13 slides in the long guide hole 15 and moves in the left-right direction. In the example of FIGS. 1A and 1B, the pivot 13 is at the left end of the long guide hole 15. While in this embodiment, the pivot 13 is on the lever 1 side and the long guide hole 15 is on the connecting member 14 side, they can be provided the other way around, so that the pivot 13 is on the connecting member 14 side and the long guide hole 15 is on the lever 1 side. Also, the shapes of the pivot 13 and the long guide hole 15 can be the same as pivots 19 and 20, and long guide holes 17 and 18, described later.

In FIGS. 1A and 1B, arms 9 and 10 having the same shape and the same size as each other are provided in left-right symmetry below the brush holder base 8. Long guide holes 17 and 18 (examples of long-hole parts) are respectively provided in the arms 9 and 10. Pivots 19 and 20 (examples of protrusions) are secured to the surface of the deck base 16 (one example of a base member), and fit respectively into the long guide holes 17 and 18. The relationship between the pivots 19 and 20 and the long guide holes 17 and 18 is the same as that between the pivot 13 and the long guide hole 15 described above. That is, in conjunction with the movement of the arms 9 and 10, the pivots 19 and 20 slide in the long guide holes 17 and 18 and move in the left-right direction. In the example of FIG. 1A, the pivot 19 is at the left end of the long guide hole 17 and the pivot 20 is at the right end of the long guide hole 18. While in this embodiment, the pivots 19 and 20 are on the deck base 16 side and the long guide holes 17 and 18 are on the arms 9 and 10 side, they can be provided the other way around, so that the pivots 19 and 20 are on the arms 9 and 10 sides, and the long guide holes 17 and 18 are on the deck base 16 side.

Figure 4:
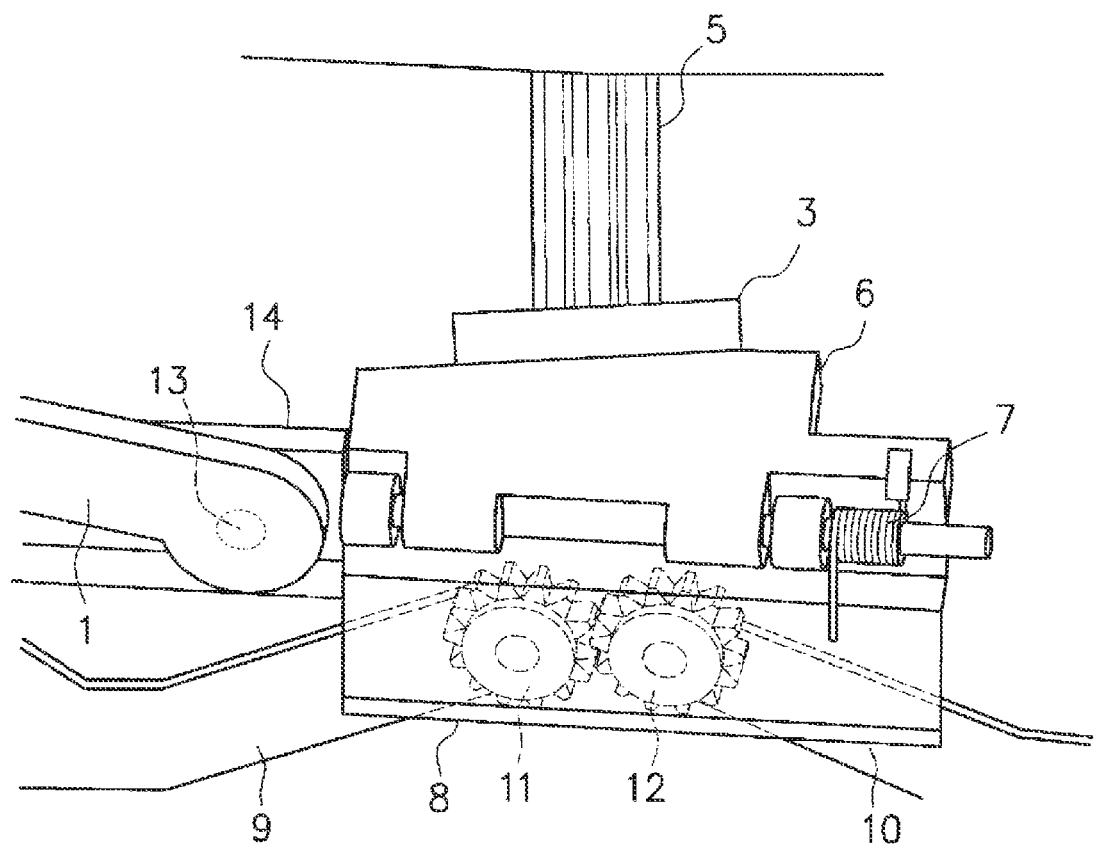
FIG. 4 is an enlarged perspective diagram of an example of the configuration of a cleaning unit, and the vicinity thereof, of a head-cleaning device according to an embodiment of the present invention.

The arms 9 and 10 respectively include cogs 11 and 12 as shown in FIG. 4, provided on the inner side of the brush holder base 8. The cogs 11 and 12 interlock with each other, and each can rotate. The center axes of rotation of the cogs 11 and 12 are secured on the inner side of the brush holder base 8. This connects the arms 9 and 10 to the brush holder base 8. In conjunction with the movement of the lever 1, the cogs 11 and 12 rotate, whereby the arms 9 and 10 operate in left-right symmetry. The brush holder base 8 thus moves up and down as shown in FIGS. 1A and 2B.

Since the arms 9 and 10 having the same shape and the same size are provided in left-right symmetry in this manner, they need not be manufactured separately and can therefore be manufactured at lower cost.

The head-cleaning device of this embodiment with the configuration described above is provided in, for example, a magnetic tape drive (media read/write device). A cleaning operation will next be explained, taking as an example a case where the invention is applied in a magnetic tape drive.

Figure 5A:
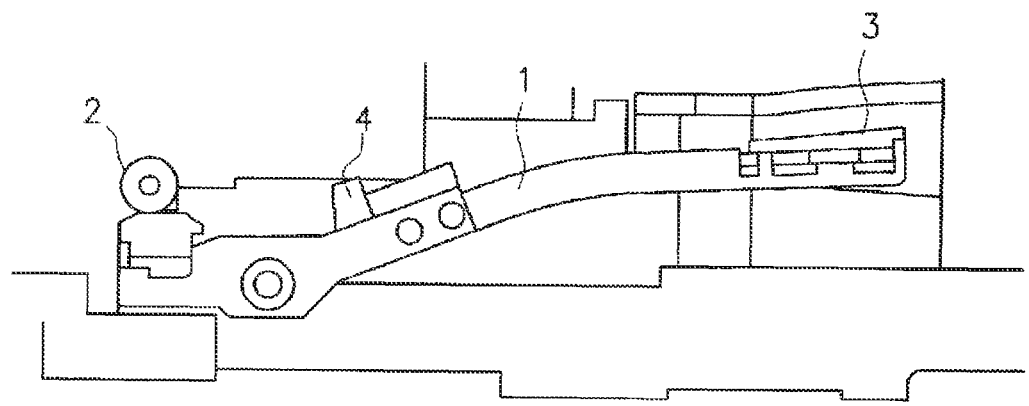
FIGS. 5A and 5B are an explanatory front diagram of an example of an operation where a brush filament moves in a circular arc in a head-cleaning device according to an embodiment of the present invention.
Figure 5B:
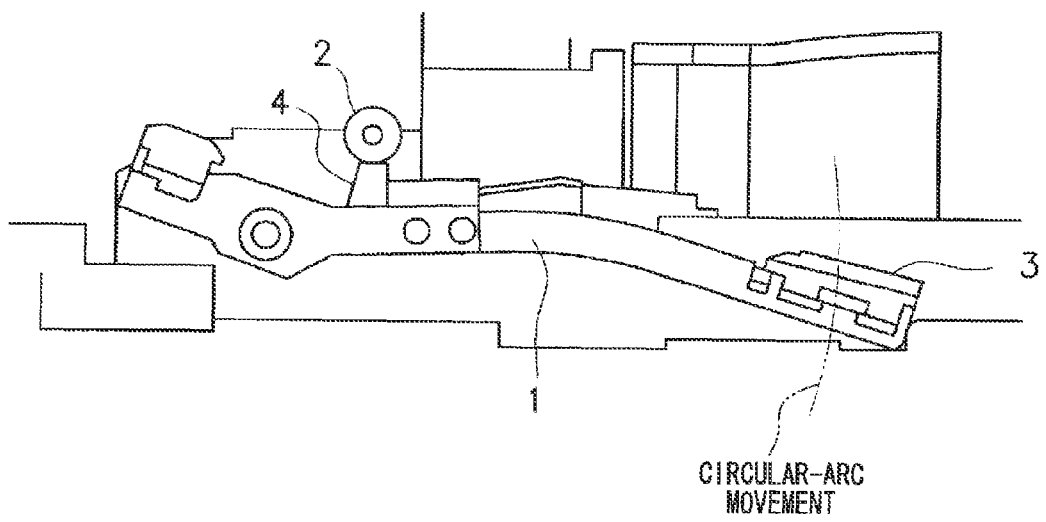

In the state of FIG. 1A (the state before a tape is loaded), when tape-loading starts, a loading mechanism (not shown) pushes the lever 1 downward. The bearing described in FIGS. 5A and 5B is one example of this loading mechanism. When the lever 1 is pushed downward, in FIG. 1B, the lever 1 moves in a circular-arc trajectory (circular-arc movement) as indicated by arrow a. This operation of the lever 1 is the same as that of the lever 1 described in FIGS. 5A and 5B.

In FIG. 1B, when the lever 1 moves in a circular arc as indicated by the arrow a, the pivot 13 at the left end of the long guide hole 15 slides in the long guide hole 15 in the direction indicated by arrow b (i.e. to the right). This movement applies a downward force to the cogs 11 and 12, which thereby rotate, and the pivot 19 at the left end of the long guide hole 17 slides to the right in the long guide hole 17, and the arm 9 moves in the direction indicated by arrow c. At the same time, the pivot 20 at the right end of the long guide hole 18 moves to the left in the long guide hole 18, and the arm 10 moves in the direction of arrow d. That is, due to the rotation of the cogs 11 and 12, the arms 9 and 10 move in left-right symmetry. Moreover, this movement of the arms 9 and 10 makes the brush holder base 8, and the brush holder 6, the connecting member 14, the spring 7, the brush filament 3, and the cogs 11 and 12 belonging to it (hereinafter referred to collectively as 'brush holder base 8 and the like') move in the direction of arrow e (downwards). The direction of arrow e is that of the grooves linearly provided in the long direction of the head 5. When the brush holder base 8 and the like start to move, the brush filament 3 abutting to the top end of the head 5 in FIG. 1B starts to move in the grooves in the head 5 in the direction of arrow e while abutting to the grooves. That is, the brush filament 3 starts to clean the head surface (outward stage).

Figure 2A:
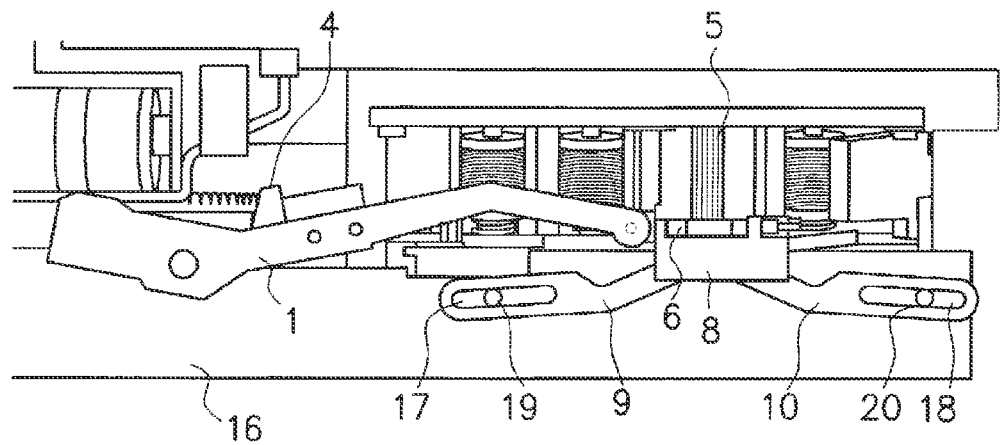
FIGS. 2A and 2B are a front diagram and a perspective diagram of an example of a state where a head-cleaning device according to an embodiment of the invention is performing cleaning.
Figure 2B:
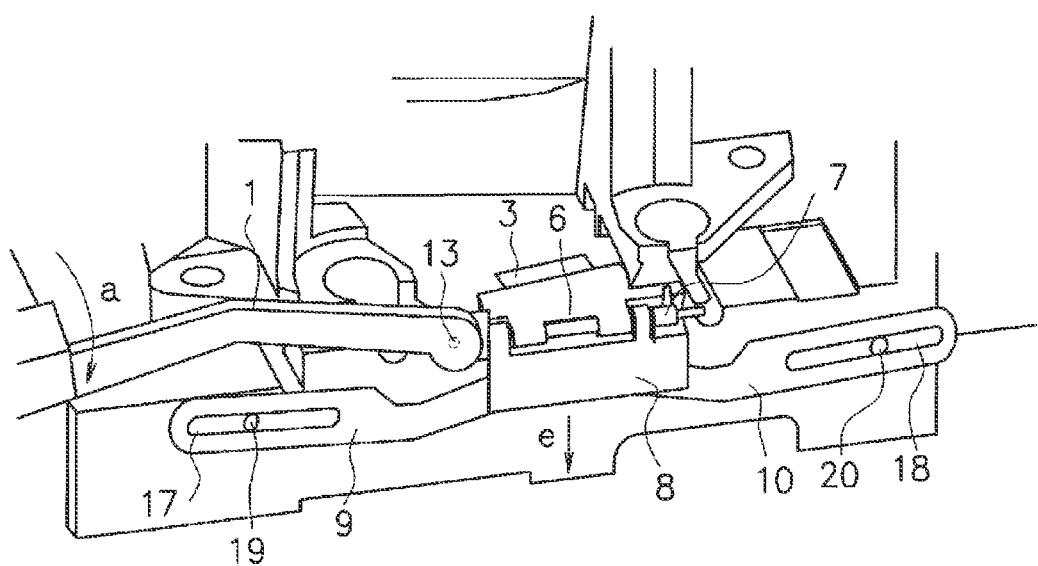

FIGS. 2A and 2B show an example of a state when the brush holder base 8 is moving in the direction of arrow e (the state during cleaning) FIG. 2A is a front diagram of the head-cleaning device of this embodiment, and FIG. 2B is a perspective diagram of the head-cleaning device of this embodiment. The head 5 is not shown in FIG. 2B. Instead, FIG. 4 is an enlarged diagram of the brush filament 3 abutting to the head 5 and the vicinity thereof.

Figure 9C:
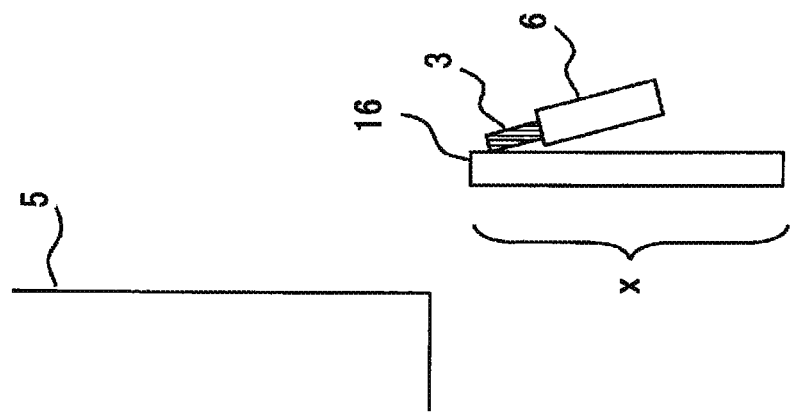
FIGS. 9A, 9B, and 9C are side diagrams of a transition example when a head-cleaning unit of a head-cleaning device according to an embodiment of the present invention is moved to a standby point.

As the lever 1 continues to move in the direction indicated by arrow a (downward circular-arc movement), in conjunction therewith, the brush holder base 8 and the like continue to move in the direction indicated by arrow e. This is the state shown in FIGS. 2A and 2B, and in FIG. 4. As shown in FIG. 2A and FIG. 4, the brush filament 3 moves along the grooves in the head 5 in parallel with the downward direction indicated by arrow e while abutting to the surface of the head 5, thereby sweeping away dirt and the like in the grooves. At this time, the brush filament 3 maintains an abutting state that is almost perpendicular to the head 5 surface. FIG. 9A is a schematic side diagram of the abutting state of the brush filament 3 at this time. As shown in FIG. 9A, the angle α (abutting angle) between the brush filament 3 and the head 5 surface is, for example, approximately 90 degrees (an angle less than 90 degrees).

Subsequently, a case will be explained where the brush holder base 8 and the like have moved further from the state shown in FIGS. 2A, 2B, 4, and 9A in the direction indicated by arrow e.

Figure 3A:
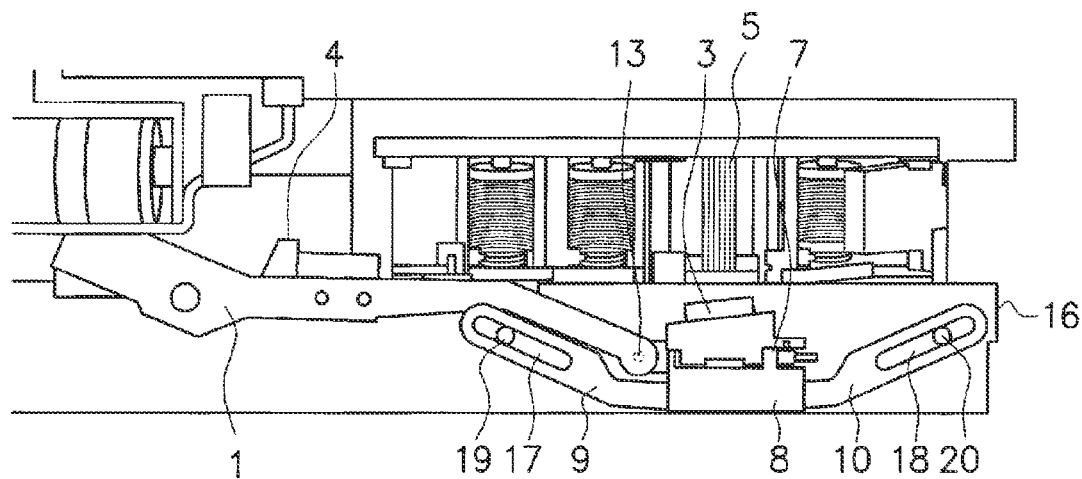
FIGS. 3A and 3B are a front diagram and a perspective diagram of an example of a state where a head-cleaning device according to an embodiment of the invention is not performing cleaning.
Figure 3B:
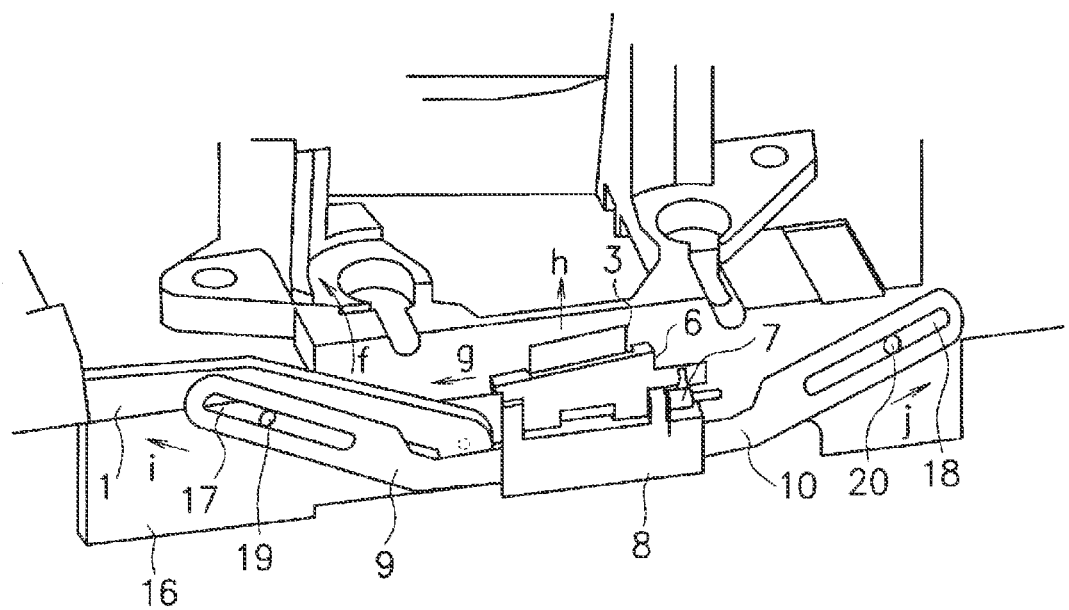
Figure 9B:
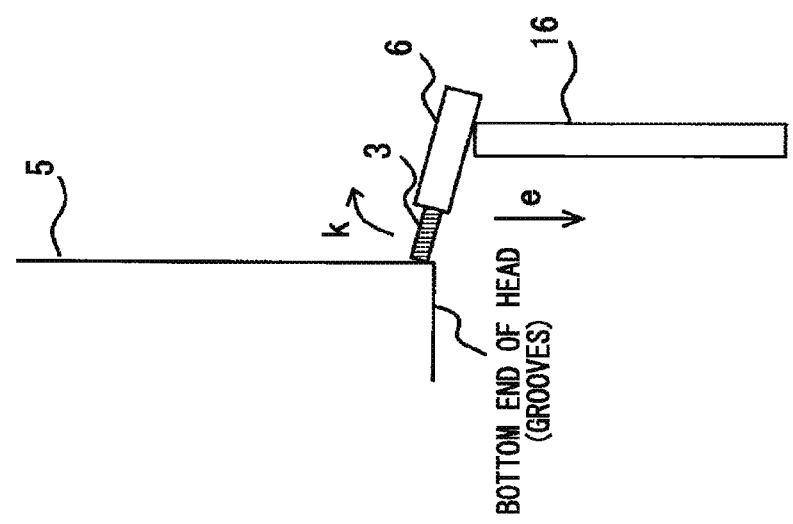
Figure 9A:
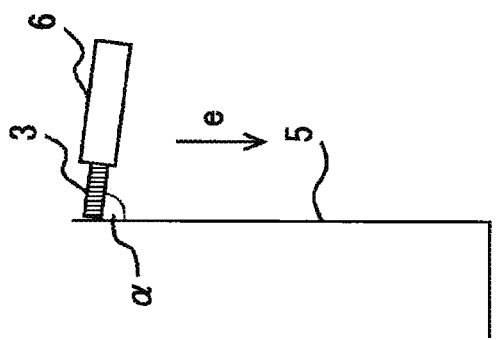

As shown in FIG. 9B, when the brush filament 3 moves in the direction indicated by arrow e and reaches the bottom end of the head 5, the brush holder 6 makes contact with the edge of the deck base 16. Following this contact, as the brush filament 3 moves further in the direction indicated by arrow e, the brush filament 3 and the brush holder 6 rotate in the direction indicated by arrow k. Due to this rotation, the brush filament 3 separates from the surface of the head 5, and the cleaning (outward stage) ends. At this time, the angle between the brush filament 3 and the head 5 changes from an abutting angle to a non-abutting angle. When the tape is loaded and the operation of the lever 1 ends (stops), as shown in FIG. 9C, the brush filament 3 and the brush holder 6 are made to stop in the vicinity of the surface of the deck base 16. FIGS. 3A and 3B show the state at this time. As shown in FIGS. 3A and 3B, the brush filament 3 and the brush holder 6 are almost horizontal with the short direction of the brush holder base 8. Furthermore, even though the stroke (the amount of horizontal movement of the brush holder base 8 and the like) is greater than the height of the deck base 16 (the length of x in FIG. 9C), as shown in FIGS. 3A and 3B, the length from the tip of the brush filament 3 to the rear end of the brush holder base 8 is less than the height of the deck base 16 (the brush holder base 8 and the like are not projecting below the deck base 16). This is due to the movement of the arms 9 and 10, and has the advantageous effect of enabling the brush holder base 8 and the like to be stored in a smaller space.

Thus the lever 1 stops moving and the cleaning ends at the same time that the tape is loaded (stored), whereby the brush holder base 8 and the like standby in the vicinity of the surface of the deck base 16.

Thereafter, when the tape is removed in the state shown in FIGS. 3A, 3B and 9C, the operations shown in FIGS. 1A, 1B, 2, and, 3 are performed in reverse order. That is, in FIG. 3B, the lever 1 moves in a circular arc in the direction indicated by arrow f (upward). Consequently, the pivot 13 at the right end of the long guide hole 15 slides in the direction indicated by arrow g (to the left). This sliding movement makes the arms 9 and 10 move respectively in the directions indicated by arrows i and j, and the brush holder base 8 and the like move in the direction indicated by arrow h. The direction indicated by arrow h is the direction along the grooves provided linearly in the long direction of the head 5 (the opposite direction of arrow e). When the brush holder base 8 and the like start to move, the brush filament 3 standing by in the vicinity of the deck base 16 in FIGS. 3A and 3B starts again to abut to the grooves in the head 5, and starts to move in the grooves in the direction indicated by arrow h while abutting to them. That is, the brush filament 3 starts to clean the head surface again (return stage).

Following the state of FIGS. 3A and 3B, as the brush holder base 8 and the like continue to move in the direction indicated by arrow h, the state becomes that shown in FIGS. 2A, 2B and 9B, and the brush filament 3 continues to clean the head 5. The operation during cleaning is the same as that described above using FIGS. 2A and 2B.

When the brush holder base 8 and the like move further in the direction indicated by arrow h, they return to the state of FIGS. 1A and 1B. At this time the brush filament 3 stops moving in a state of abutting to the top end of the head 5. The cleaning of the head 5 by the brush filament 3 (return stage) thereby ends.

As described above, according to this embodiment, by moving a brush parallel with grooves provided in the surface of a head while the brush is abutted to the grooves, the grooves are cleaned thoroughly. This can prevent the accumulation of dirt and the like on the head surface due to deficient sweeping. Therefore, errors in reading and writing from/to the head due to accumulation of dirt and the like (errors during reading and writing of data) can be prevented.

While the brush filament 3 is moving up and down (moving along the grooves in the head surface in the directions indicated by arrows e and h), there is a danger that the arms 9 and 10 will wobble in the left-right direction. As units for suppressing this wobbling, another long guide hole in addition to the long guide holes 17 and 18 can be provided in at least one of the arms 9 and 10, and pivots corresponding to this other long guide hole (other pivots in addition to the pivots 19 and 20) can be provided at the deck base 16. The other long guide holes can be, for example, L-shaped or semicircular. When the arms 9 and 10 move in left-right symmetry, in conjunction therewith, the other pivots fit into the other long guide holes and slide along them. Thus, in addition to the long guide holes 17 and 18 and the pivots 19 and 20, by providing L-shaped or semicircular other long guide holes in at least one of the arms 9 and 10, and other pivots corresponding to those other long guide holes, in conjunction with the up-down movement of the arms 9 and 10, the other pivots fit into the other long guide holes and slide. Therefore, wobbling in the left-right direction of the arms 9 and 10 can be suppressed, and the up-down movement of the brush filament 3 can be maintained. By providing another long guide hole in at least one of the arms 9 and 10, the arm 9 and the arm 10 can be formed in mutually different shapes and sizes.

While the embodiment of the invention has been described, the invention is not limited to the embodiment described above, and various modifications can be made without deviating its main points.

Provided is a head-cleaning device and head-cleaning method that can thoroughly clean grooves provided in a head, and thereby prevent accumulation of dust and the like due to deficient sweeping.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A head-cleaning device that cleans a surface of a head for reading and writing data from/to a medium, comprising:
    a cleaning unit configured to move in parallel with grooves provided in the surface of the head while abutted to the grooves, and thereby cleans the surface of the head.

2. The head-cleaning device according to claim 1, wherein the cleaning unit comprises a brush configured to abut to the grooves provided along a predetermined direction of the surface of the head, and move in parallel with the grooves.

3. The head-cleaning device according to claim 1, further comprising:
    a lever unit and two arm units configured to support and move the cleaning unit; wherein
    the lever unit moves in a circular-arc trajectory, and
    the two arm units move in left-right symmetry by interlocking and rotation of two cogs provided to each section of the lever unit that supports the cleaning unit in conjunction with movement of the lever unit, and move the cleaning unit in parallel.

4. The head-cleaning device according to claim 3, wherein, after cleaning of the head has ended, the cleaning unit moves to a predetermined standby point by the movement of the lever unit and the two arm units, and
    by making contact with a predetermined member when moving to the predetermined standby point, the cleaning unit is changed from an angle where the cleaning unit abuts substantially perpendicular to the surface of the head to an angle where the cleaning unit does not abut to the surface of the head and is substantially parallel thereto.

5. The head-cleaning device according to claim 3, further comprising:
    a base member configured to support the two arm units, the base member having two protrusions secured thereto, wherein
    each of the two arm units has one long hole part, each of the two protrusions is fitted to the long hole part of the two arm units; and
    when the two arm units move in left-right symmetry, each of the two protrusions slides in the long hole part.

6. The head-cleaning device according to one of claim 3, wherein
    the lever unit includes a protrusion part secured to a tip part that supports the cleaning unit;
    the cleaning unit includes a long hole part for fitting the protrusion therein in a connection part of the cleaning unit that connects to the tip part of the lever unit; and
    when the lever unit moves in a circular-arc trajectory, the protrusion slides in the long hole part.

7. The head-cleaning device according to claim 5, wherein after cleaning of the head has ended, the cleaning unit is moved by the lever unit and the two arm units to a vicinity of the base member as a standby point, where the cleaning unit is stored next to the base member; and
    the cleaning unit is stored so that the cleaning unit does not protrude from the base member.

8. The head-cleaning device according to claim 5, wherein at least one of the two arm units includes another long hole part provided separately from the long hole part;
    the base member includes another protrusion provided separately from the protrusion and corresponding to said another long hole part; and
    when the two arm units move in left-right symmetry, in conjunction therewith said another protrusion fits into said another long hole part and slides therein.

9. A head-cleaning method performed by a head-cleaning device that cleans a surface of a head for reading and writing data from/to a medium, wherein
    the head-cleaning device moves a predetermined cleaning unit in parallel with grooves provided in the surface of the head while abutted along the grooves, and thereby cleans the surface of the head.

* * * * *